UNITED STATES PATENT OFFICE.

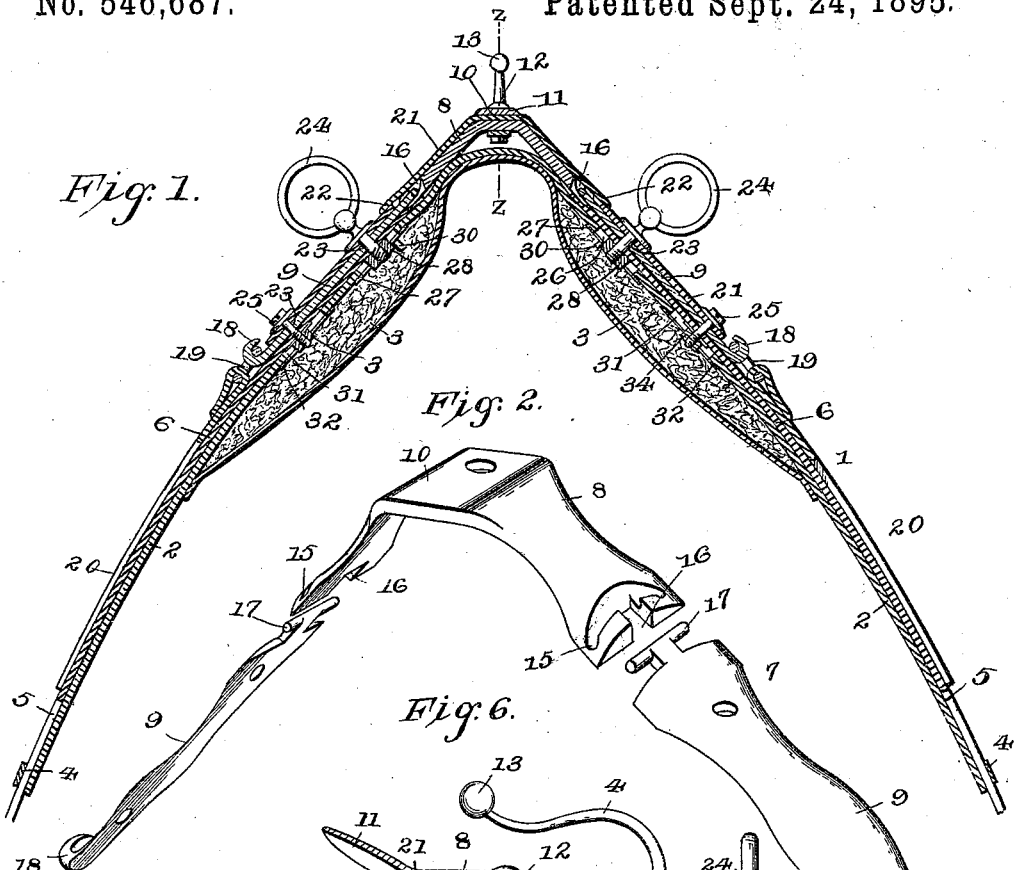

LIONEL J. VARGA AND HOWARD A. VARGA, OF AUSTIN, TEXAS.

HARNESS-SADDLE.

SPECIFICATION forming part of Letters Patent No. 546,687, dated September 24, 1895.

Application filed October 29, 1894. Serial No. 527,305. (No model.)

*To all whom it may concern:*

Be it known that we, LIONEL J. VARGA and HOWARD A. VARGA, citizens of the United States, residing at Austin, in the county of Travis and State of Texas, have invented a new and useful Adjustable Gig-Saddle, of which the following is a specification.

This invention relates to adjustable gig-saddles, and it has for its object to effect certain improvements in that class of harness-saddles having trees that are self-adjusting to different-sized horses, while at the same time accommodating themselves to self-adjustment, so as to guard against pinching or otherwise injuring the back of the animal carrying the saddle.

The invention further contemplates a construction of gig-saddle the several parts of which can be readily removed or separated from each other and replaced by hand without the use of any particular tools.

With these and other objects in view, which will readily appear as the nature of the invention is better understood, the same consists in the novel construction, combination, and arrangement of parts hereinafter more fully described, illustrated, and claimed.

In the drawings, Figure 1 is a central longitudinal sectional view of a gig-saddle constructed in accordance with this invention. Fig. 2 is a perspective view of the sectional tree, showing the several parts thereof disconnected from each other. Fig. 3 is a bottom plan view of one side of the pad-piece with the padding removed, exposing the nut connection of the terrets and pad-screws to the pad-piece. Fig. 4 is a detail sectional view on the line $x\ x$ of Fig. 3. Fig. 5 is a similar view on the line $y\ y$ of Fig. 3. Fig. 6 is a similar view on the line $z\ z$ of Fig. 1.

Referring to the accompanying drawings, 1 designates the main pad-body of the saddle, that is constructed in suitable sizes to be adapted for different classes of work and different-sized animals. The said pad-body 1 essentially comprises the top pad-piece 2, to the under opposite sides of which are secured the usual pads 3, and at its opposite extremities the pad-piece 2 is provided with the billet-loops 4, through which are passed the billets 5 of the side skirt-leathers 6, that are arranged on opposite top sides of the pad-piece 2, and are adapted to be detachably fastened in position thereon without the use of stitching by means of the sectional hinged saddle-tree 7. The sectional saddle-tree 7 essentially comprises the V-shaped center plate or casting 8 and the opposite hinged side plates 9. The V shape of the center plate 8 of the sectional tree agrees with the proper conformation of the saddle at the center thereof, and said center plate 8 is provided with a central flattened portion 10 at the apex thereof, on which is clamped the usual saddle-seat or cantle-plate 11. The saddle-seat or cantle-plate 11 is clamped onto the flat center portion of the plate 8 by means of the bolt 12, that also serves to secure one end of the check-hook 13 to said plate at the front side thereof and suitably secured to the flattened center portion of the said plate 8, and projecting beyond the rear side thereof is the usual back-strap loop 14.

The V-shaped center plate 8 of the sectional tree 7 is provided at its opposite ends with the transverse hinge-eyes 15, with which communicate the T-shaped slots 16, formed in the outer sides of the said plate 8 at the ends thereof to provide for the engagement and disengagement of the T-shaped pintle-tongues 17 with the opposite ends of the plate 8. The T-shaped pintle-tongues 17 are projected integrally from the inner ends of the side plates 9 of the sectional tree 7, and the horizontal pintle portions of such tongues are of a width less than the width of the plates 9, so that the hinged ends of the plates 9 and the ends of the plate 8 may be made as nearly flush as possible.

The pintle-tongues 17 of the side plates 9 are adapted to loosely engage in the transverse hinge-eyes 15 at the ends of the center plate, so that the opposite sides of the saddle may have a free up-and-down movement for self-adjustment, while at the same time the slots 16 admit of the easy connection and disconnection of the side plates and the center plate comprising the sectional tree. The hinged side plates 9 are provided at their outer ends with the hooks 18, with which are loosely engaged the strap-loops 19, to which are connected one end of the usual bearing-straps 20, with which are connected the shaft-tugs in the usual manner. The said side plates 9, as well as the center plate 8 of the sectional tree, which is arranged on top of the pad-body 1, are adapted to be covered with the cover-leathers 21, which serve to hide the castings forming the sectional tree, while at the same time not interfering with the adjustment of the same, and the cover-leather 21, covering the center plate 8 and secured thereon by the cantle-plate 11, is separate from the similar leathers covering the plates 9 and is provided at its ends with the short jockey extensions 22, overlapping and protecting the hinge connection between the plates of the tree.

The cover-leathers for the side plates 9 are preferably stitched to the side edges of the side skirt-leathers 6, on which the side plates 9 are placed, and the said cover and skirt-leathers and also the said side plates 9 are provided with the aligned holes or openings 23 to receive the threaded shanks of the terrets 24 and the pad-screws 25. Referring particularly to the detachable connection of the threaded shanks of the terrets 24, with the pad-piece 2 of the pad-body, it is to be noted that at the proper points the said pad-piece is provided with the longitudinally-disposed slots 26, that are faced upon the inner side of the pad-piece 2 by the metallic slotted facing-plates 27, and the longitudinal slots of said facing-plates 27, and the slots in the pad-piece 2 agreeing therewith, accommodate for passage therethrough the terret-nuts 28, having cross-arms 29, that are adapted to be turned transversely across the slot of the plates 27 at the inner side of the pad-piece 2. The nuts 28 engage the threaded shanks of the terrets 24, and after having been inserted through the slots in the pad-piece and in the plate 27 are adapted to be turned transversely of said slots against the opposite catch-studs 30. The catch-studs 30 are projected from the inner side of the plates 27 at opposite sides of the longitudinal slots in said plate, so that the cross-arms of the terret-nuts will be turned thereagainst, and the terrets can be screwed up as tight as desired.

Adjacent to the slots 26 the pad-piece 2 of the pad-body is further provided with longitudinally-disposed slots 31, faced at the inner side of the pad-piece 2 by the longitudinally-slotted metal facing-plates 32, which plates are further provided at one end of the longitudinal slots therein with the widened nut-openings 33, that freely admit therethrough the pad-screw nuts 34. The pad-screw nuts 34 are adapted to receive the inner ends of the pad-screws 25, and are provided with the opposite flattened flanged sides 35, that are adapted to be slid into engagement with the longitudinal slots of the plates 32 after having been passed through the openings 33, communicating with one end of said slots. With the nuts 34, on the inner ends of the screws 25, the said nuts are passed through the openings 33, and are then slid into the longitudinal slots of the plates 31, the flanges at opposite sides of said nuts engaging opposite edges of the slots, so that the pad-screws may be tightened up to securely fasten the sectional tree onto the pad-body. To separate or disconnect the sectional tree from the pad-body for repair or other purpose the terrets are loosened sufficiently, so that the nuts 28, with the cross-arms 29, may be turned out of the slots receiving the same in the pad-piece of the pad-body, and by then loosening the pad-screws the pad-screw nuts may be slipped up to the nut-openings 33, and then the sectional tree including the skirt-leathers can be lifted off or separated from the pad-body, as will be easily understood.

From the above it is thought that the construction and many advantages of the herein-described gig-saddle will be readily apparent to those skilled in the art, and it will be understood that changes in the form, proportion, and the minor details of construction may be resorted to without departing from the principle or sacrificing any of the advantages of this invention; and at this point it may be well to observe that the pad-screw and terret connections with the pad-body may be employed in connection with any style of saddle other than the form of saddle illustrated and described.

Having thus described the invention, what is claimed, and desired to be secured by Letters Patent, is—

1. In a gig saddle, the combination of the pad body, a sectional self-adjusting tree arranged on the body and comprising a V-shaped center plate having a central flattened top portion, and opposite side plates having detachable hinge connections with the opposite extremities of said center plate, separate cover leathers for the different sections of the tree, the cover leather placed on said V-shaped center plate being provided at its ends with short jockey extensions overlapping and protecting said hinge connections between the plates of the tree, and the saddle seat or cantle plate clamped on the central flattened top portion of the V-shaped center plate and on the cover leather for such plate, substantially as set forth.

2. In a gig saddle, the pad body provided in the pad piece thereof with opposite longitudinally disposed slots, longitudinally slotted metallic facing plates attached to the under face of the pad piece over the slots and provided with widened nut openings at one end of the slots, the tree arranged on the pad piece, the terrets and pad screws having their threaded shanks passed through opposite portions of the tree, the terret nuts engaging the shanks of the terrets and having a detachable connection with the pad piece of the pad body, and the pad screw nuts adapted to freely pass through the nut openings of the facing plates and having opposite flattened flanged sides adapted to engage in the longitudinal slots of said plates, substantially as set forth.

In testimony that we claim the foregoing as our own we have hereto affixed our signatures in the presence of two witnesses.

L. J. VARGA.
HOWARD A. VARGA.

Witnesses:
JOHN M. HUGO,
HENRY URBANECK.